(12) United States Patent
Srinivasa et al.

(10) Patent No.: US 9,008,997 B2
(45) Date of Patent: Apr. 14, 2015

(54) SYSTEM AND METHOD FOR VIBRATION ANALYSIS AND PHASE ANALYSIS OF VIBRATION WAVEFORMS USING DYNAMIC STATISTICAL AVERAGING OF TACHOMETER DATA TO ACCURATELY CALCULATE ROTATIONAL SPEED

(75) Inventors: Ramesh B. Srinivasa, Mysore (IN); Nidhin A. Jose, Cochin (IN)

(73) Assignee: Fluke Corporation, Everett, WA (US)

( * ) Notice: Subject to any disclaimer, the term of this patent is extended or adjusted under 35 U.S.C. 154(b) by 741 days.

(21) Appl. No.: 12/911,507

(22) Filed: Oct. 25, 2010

(65) Prior Publication Data

US 2011/0098968 A1    Apr. 28, 2011

(30) Foreign Application Priority Data

Oct. 26, 2009    (IN) .......................... 2591/CHE/2009

(51) Int. Cl.
*G01P 3/00*    (2006.01)
*G01H 1/00*    (2006.01)

(52) U.S. Cl.
CPC ..................................... *G01H 1/003* (2013.01)

(58) Field of Classification Search
CPC ......... G01H 11/08; G01H 13/00; G01H 1/00; G01H 1/003; G01H 3/00; G01H 9/00; G01H 9/004; G01M 11/083; G01M 11/3172; G01M 3/24
USPC ..................... 702/34, 56, 122–123, 182–185; 340/500, 870.16
See application file for complete search history.

(56) References Cited

U.S. PATENT DOCUMENTS 5,621,656 A * 4/1997 Langley ......................... 700/280
6,285,947 B1 * 9/2001 Divljakovic et al. ........... 701/110
6,549,869 B1 * 4/2003 Piety et al. ..................... 702/122

FOREIGN PATENT DOCUMENTS

CN         101135601 A       3/2008
JP         2007-248061 A     9/2007

OTHER PUBLICATIONS

Chinese Office Action mailed Feb. 7, 2014, in Chinese Application No. 201010533809, filed Oct. 26, 2010, 12 pages.
Japanese Office Action mailed Oct. 29, 2013, in Japanese Application No. 2010-240109, filed Oct. 26, 2010, 2 pages.

* cited by examiner

*Primary Examiner* — Elias Desta
(74) *Attorney, Agent, or Firm* — Christensen O'Connor Johnson Kindness PLLC

(57) ABSTRACT

Vibration analysis is performed on a machine having a variable frequency drive by using a tachometer to monitor rotational speed of the drive shaft and a logic device to calculate speed parameters associated with the drive shaft using the tachometer data. The speed parameters include a maximum speed, a minimum speed, and an average speed of the drive shaft. By correlating the vibration spectra of the motor drive with the speed parameters, machine faults can be identified based upon the energy distribution in the spectra. Further, vibration waveforms from two or more locations on the machine can be sequentially acquired through synchronous triggering by using a pulse edge of a stable tachometer signal. The waveforms can be compared to determine a phase difference to help in identifying any machine faults that may be present.

18 Claims, 7 Drawing Sheets

SYSTEM AND METHOD FOR VIBRATION ANALYSIS AND PHASE ANALYSIS OF VIBRATION WAVEFORMS USING DYNAMIC STATISTICAL AVERAGING OF TACHOMETER DATA TO ACCURATELY CALCULATE ROTATIONAL SPEED

CROSS-REFERENCE TO RELATED APPLICATIONS

This application claims the benefit of the following application which is incorporated by reference in its entirety, Indian Provisional Application No. 2591/CHE/2009, entitled "SYSTEM AND METHOD FOR VIBRATION ANALYSIS AND PHASE ANALYSIS OF VIBRATION WAVEFORMS USING DYNAMIC STATISTICAL AVERAGING OF TACHOMETER DATA TO ACCURATELY CALCULATE ROTATIONAL SPEED", filed Oct. 26, 2009.

TECHNICAL FIELD

The present disclosure relates generally to vibration analysis and phase analysis of vibration waveforms. More particularly, the present disclosure relates to using dynamic statistical averaging of tachometer data for accurate speed calculation in conjunction with vibration analysis and phase analysis of vibration waveforms.

BACKGROUND

Machine vibrations can occur in all types of rotating equipment, such as electric motors, fans, turbines, etc. The vibrations may be benign vibrations that are characteristic of regular operation of the machine. However, faulty machine conditions, such as unbalance, misalignment, bearing ware, looseness, and eccentric shafts, can cause more serious vibrations. Machinery vibrations can be measured by using a sensor such as an accelerometer to measure vibration waveforms. In conjunction with the accelerometers, vibration analyzers can be used to obtain frequency and amplitude information about the vibrations that are present.

SUMMARY

Vibration analysis may be performed on a machine having a variable frequency drive by using a tachometer to monitor rotational speed of the drive shaft and a logic device to calculate speed parameters associated with the drive shaft using the tachometer data. The speed parameters may include a maximum speed, a minimum speed, and an average speed of the drive shaft. By correlating the vibration spectra of the motor drive with the speed parameters, machine faults can be identified based upon the energy distribution in the spectra. Further, vibration waveforms from two or more locations on the machine can be sequentially acquired through synchronous triggering by using a pulse edge of a stable tachometer signal. The pulse edge can be either a rising edge of a falling edge. The waveforms can be compared to determine a phase difference for identifying machine faults that may be present.

BRIEF DESCRIPTION OF THE DRAWINGS

Examples of a vibration analysis system are illustrated in the figures. The examples and figures are illustrative rather than limiting.

DETAILED DESCRIPTION

Figure 1:
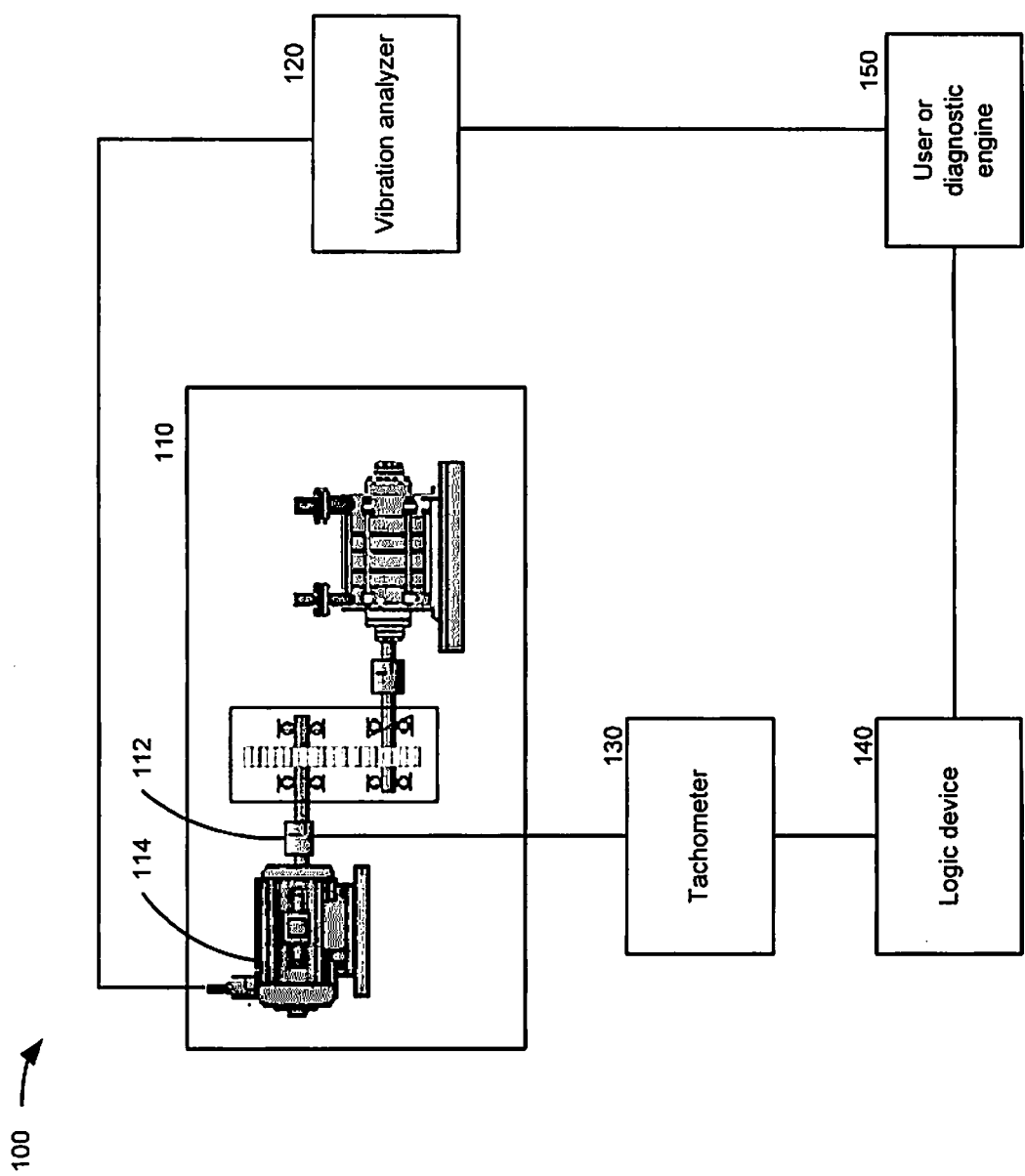
FIG. 1 depicts a block diagram illustrating an example of a vibration analysis system, according to an embodiment of the disclosure.

The following description and drawings are illustrative and are not to be construed as limiting. Numerous specific details are described to provide a thorough understanding of the disclosure. However, in certain instances, well-known or conventional details are not described in order to avoid obscuring the description.

Without intent to further limit the scope of the disclosure, examples of instruments, apparatus, methods and their related results according to the embodiments of the present disclosure are given below. Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

The terminology used in the description presented below is intended to be interpreted in its broadest reasonable manner, even though it is being used in conjunction with a detailed description of certain specific examples of the invention. Certain terms may even be emphasized below; however, any terminology intended to be interpreted in any restricted manner will be overtly and specifically defined as such in this Detailed Description section.

A variable frequency drive (VFD) converts a fixed-frequency supply voltage to one that has a continuously variable frequency, thus allowing the speed of a motor in the system to be adjustable. With a VFD, the frequency or the number of revolutions per minute (RPMs) of the motor changes depending upon the load being driven by the motor. Consequently, using a vibration spectrum analyzer to measure a VFD would show the presence of a range of frequencies, rather than a single frequency peak. Moreover, a mathematical fast Fourier transform (FFT) analysis of the vibration spectrum is based upon the particular motor speed at each of those frequencies. Thus, one of the input parameters required for an FFT analysis is the motor speed and how it varies over time. It would be advantageous to be able to determine speed parameters of the motor, such as the minimum speed, the maximum speed, and the mean speed, and how the speed parameters change over the acquisition time of a measurement in order to analyze the vibration spectra generated by VFDs.

Vibration analysis of a rotating machine can include a comparative analysis between the fundamental vibrating frequency and the harmonics generated by the machine. FIG. 1 depicts a block diagram 100 illustrating an example of a vibration analysis system especially suitable for monitoring variable frequency drives (VFD), according to an embodiment of the disclosure.

A machine 110 to be analyzed may have a rotating drive shaft 112 coupled to a VFD 114. A tachometer 130 monitors the rotational speed of the drive shaft 112. There are many ways in which tachometer pulses can be generated. For example, reflective tape can be placed on the rotating drive shaft of the equipment to be monitored. An optical transducer transmits light from a light source and can detect the reflection of the transmitted light from the reflective tape. Each revolution of the rotating drive shaft generates one tachometer pulse. Other types of transducers can also be used as a tachometer for monitoring the speed of the drive shaft 112, for example, an encoding disk attached to the drive shaft can interrupt an optical beam between photoelectric transducers to generate tachometer pulses.

A vibration analyzer 120 monitors the vibration frequency spectrum of the VFD 114. Because the RPM of a VFD varies depending upon the load being driven, the energy seen in the frequency spectrum of a VFD is spread over a band of frequencies rather than being located at a single frequency. For example, if a motor's RPM varies from 6000 to 7500, the energy of the fundamental frequency in the frequency spectrum is spread between 100 and 125 Hz. Similarly, the harmonics in the frequency spectrum are also spread over a finite frequency band. In contrast, an ordinary motor that does not change in frequency will have a constant RPM which corresponds to a single peak in the frequency spectrum. Thus, when a VFD motor's speed varies over a large range, it is difficult to compare frequencies of the fundamental vibrating frequency and the harmonics generated by the machine. Traditionally, a user can only rely upon a tachometer reading for the RPM and does not have information as to the rate of variation in the motor's speed.

To obtain motor speed information, the raw tachometer pulses can be sent to a logic device 140 for processing. The logic device 140 can include a semiconductor-based logic device, such as a field-programmable gate array (FPGA) and a complex programmable logic device (CPLD), an optics-based logic device, a molecular-based logic device, or any other type of logic device. The logic device 140 calculates the maximum, minimum, and average speed of the shaft 112 of the VFD 114 using, for example, a dynamic statistical averaging technique. The calculated speed parameters then can be sent to the user or a diagnostic engine 150. Spectral information determined by the vibration analyzer 120 also can be sent to the user or diagnostic engine 150 for analysis. The user or diagnostic engine 150 can correlate the spectral information from the vibration analyzer 120 with the speed parameters obtained from the logic device 140 to determine the machine fault condition or conditions giving rise to the measured vibration data. For example, the maximum shaft speed corresponds to the highest fundamental frequency, and the minimum shaft speed corresponds to the lowest fundamental frequency. The highest spectral peak would be observed at the average speed shaft. Spectral peaks observed between the highest and lowest frequencies correspond to intermediate speeds of the VFD.

Figure 2:
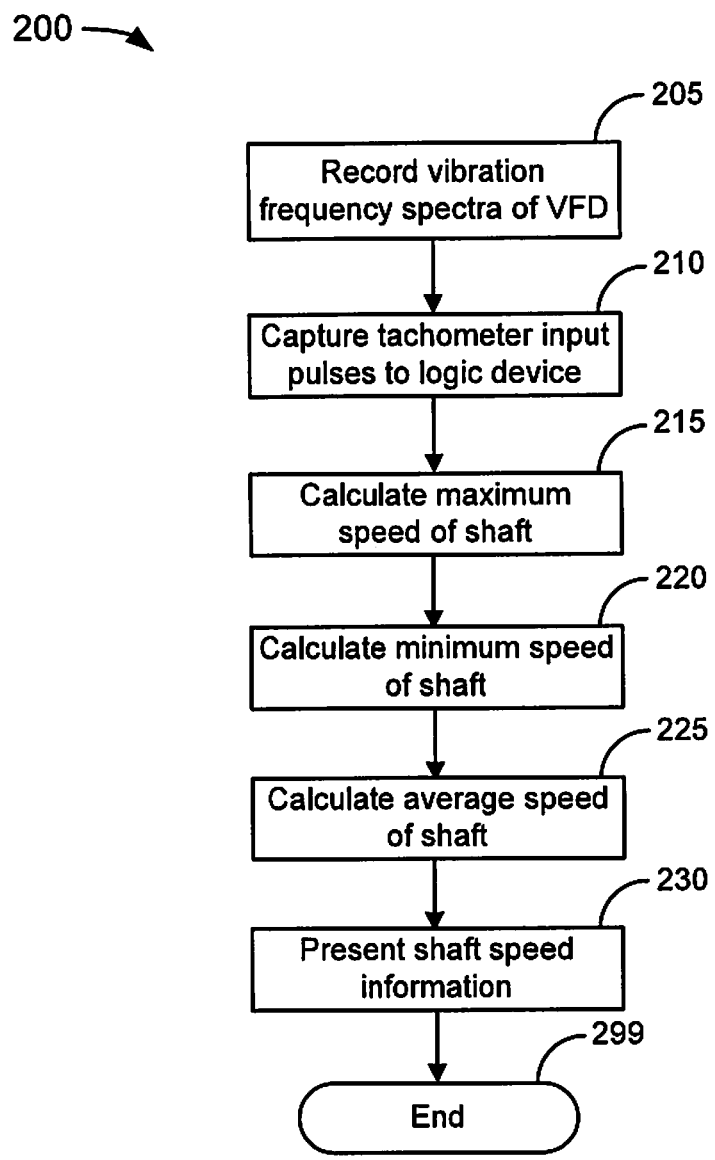
FIG. 2 depicts a flow diagram illustrating an exemplary process of vibration analysis for a variable frequency drive, according to an embodiment of the disclosure.

FIG. 2 depicts a flow diagram 200 illustrating an exemplary process of vibration analysis for a variable frequency drive, according to an embodiment of the disclosure.

At block 205 the system records the vibration frequency spectra of the VFD with a spectrum analyzer that uses a velocity transducer or an accelerometer as the sensor. The vibration frequency spectra indicate at which frequencies the energy of the drive is being dissipated, for example due to machine faults. In the case of VFDs, the frequency spectrum can have a main peak with side lobes on either side of the main peak. Further, the amplitude of the vibration spectra peaks indicate the amount of energy present at those frequencies and can aid in identifying possible sources of vibration.

At block 210 the tachometer monitoring the shaft of the VFD captures a pulse for every revolution of the shaft, and sends the data to a logic device. The logic device calculates the speed of the shaft by using dynamic statistical averaging techniques. At block 215, the maximum speed of the shaft is determined; at block 220, the minimum speed of the shaft is determined; and at block 225 the average speed of the shaft is determined.

The maximum, minimum, and average speeds of the shaft are then presented to the user or a diagnostic engine at block 230. The process ends at block 299. The user or diagnostic engine can then correlate the frequency spectra with the determined speeds of the shaft to derive conclusions about the energy distribution at different frequencies.

However, in some cases, the vibration spectra can look similar for different machine faults. For example, a bend in the drive shaft may exhibit a similar vibration spectrum as misalignment or imbalances in the motor. Thus, using vibration analysis alone can be insufficient. Vibration phase analysis can aid an analyst in distinguishing between ambiguous fault conditions.

Figure 3:
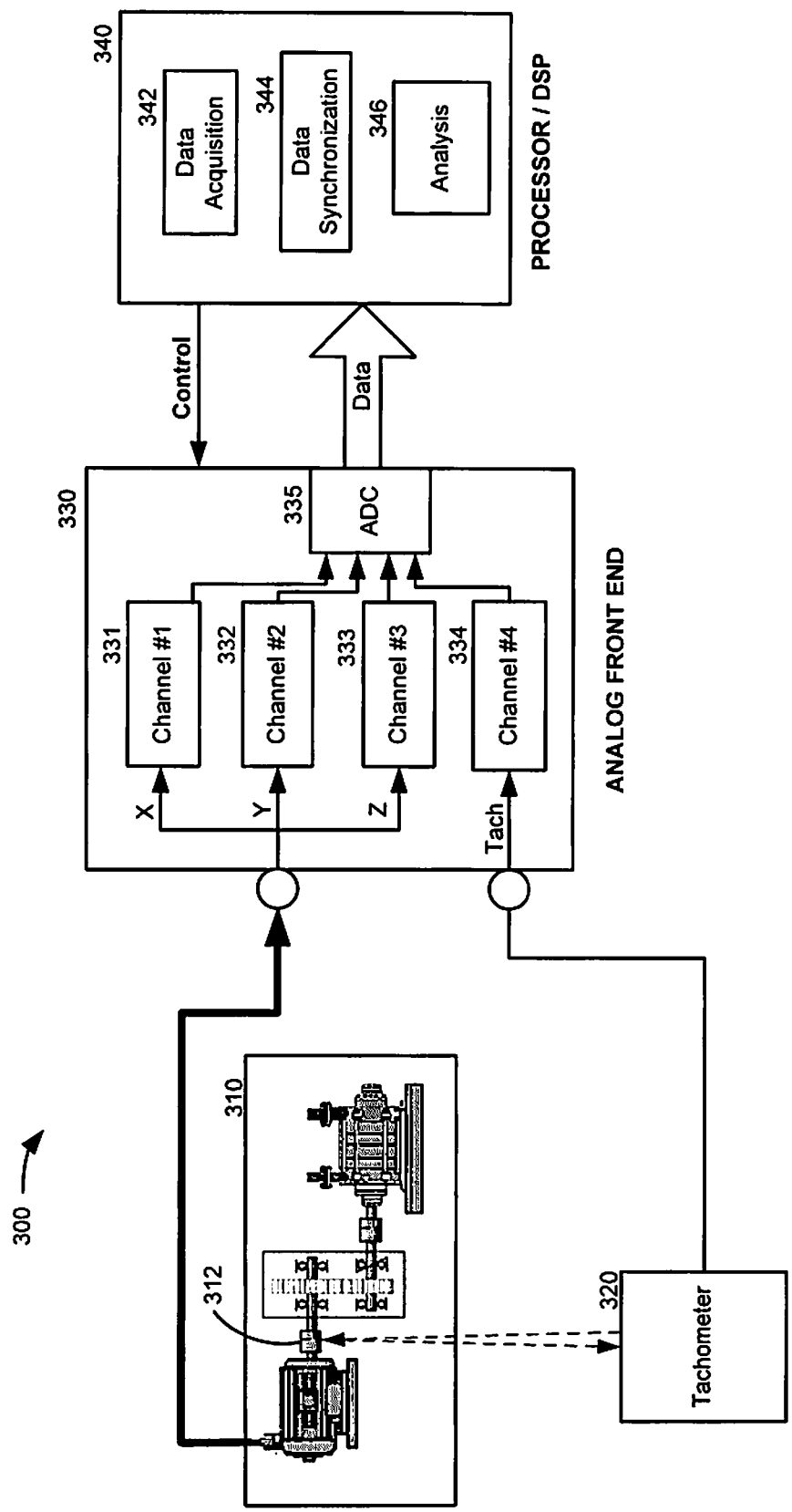
FIG. 3 depicts a block diagram illustrating an example of a traditional vibration phase analysis system.

With phase analysis, a mechanical phase difference between the driver and load's vibration signals is determined. Alternatively, a phase difference can be determined between any two points on the machine. Because an accelerometer can only measure vibrations originating from one point at a time, the waveforms from different locations on the machine are captured sequentially at different times, and thus cannot be directly compared. FIG. 3 depicts a block diagram 300 illustrating an example of a traditional vibration phase analysis system that includes the machine to be analyzed 310, a tachometer 320, an analog front end 330, and a processor 340.

A rotating drive shaft 312 of the machine 310 is monitored by the tachometer 320. Accelerometer measurements from various locations on the machine 310 are fed to channel 1 331, channel 2, 332, and channel 3 333 in the analog front end 330. Three channels are available to accommodate the three independent inputs from a tri-axial accelerometer. However, not all three channels are necessarily used for a phase analysis measurement. The tachometer pulse signal is fed to a fourth channel 334 in the analog front end 330. The data from the four channels 331, 332, 333, 334 are sent to the analog to digital converter (ADC) 335, and the data from the output of the ADC 335 are transmitted to the processor 340. Note that a separate ADC channel for the tachometer signal is required for the traditional phase analysis technique.

The processor 340 contains three modules: a data acquisition module 342, a data synchronization module 344, and an analysis module 346. The data acquisition module 342 receives the acquired accelerometer data from the analog front end 330. The data synchronization module 344 uses the tachometer pulse train as a common reference for the data acquired by each of the other channels. By synchronizing the tachometer pulse trains acquired during the acquisition of data for each of the other channels 331, 332, 333, the phase difference between the sequentially acquired waveforms can be determined. The analysis module 346 analyzes the phase difference between the channels. Note that with this traditional phase analysis system, the entire tachometer pulse train 334 must be acquired in order to synchronize the data obtained from the other three data channels 331, 332, 333.

Figure 4:
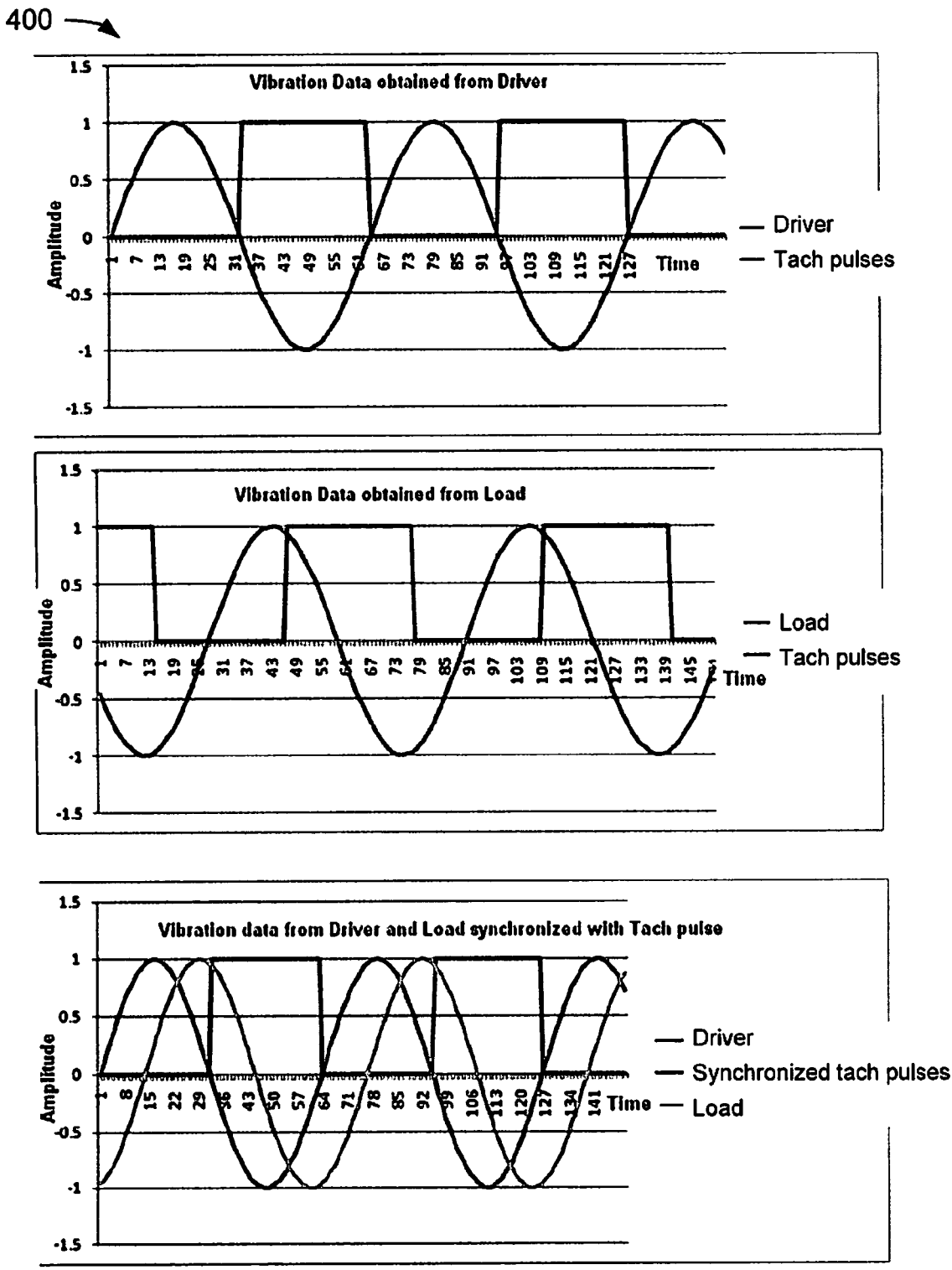
FIG. 4 shows graphs for obtaining phase information by synchronizing waveforms with a tachometer pulse obtained from a traditional vibration phase analysis system.

FIG. 4 shows graphs 400 used for obtaining phase information by synchronizing waveforms with a tachometer pulse in a traditional vibration phase analysis system.

The top graph in FIG. 4 shows the vibration data obtained from the driver as acquired by an accelerometer using a first channel. Also shown in the top graph is the tachometer pulse train acquired at the same time as the driver vibration data using the tachometer channel 334.

The middle graph in FIG. 4 shows the vibration data obtained from the load as acquired by an accelerometer using a second channel. The tachometer pulse train acquired at the same time as the load vibration data using the tachometer channel 334 is also shown in the middle graph.

The bottom graph in FIG. 4 shows vibration data of both the driver and the load after the two waveforms have been synchronized using the two tachometer pulse trains. Because the tachometer pulse trains are common for both the driver and load waveforms, the tachometer pulse train is used as a reference. After synchronizing the waveforms, it is straightforward to calculate the phase difference between the driver and load's vibration signals.

Figure 5:
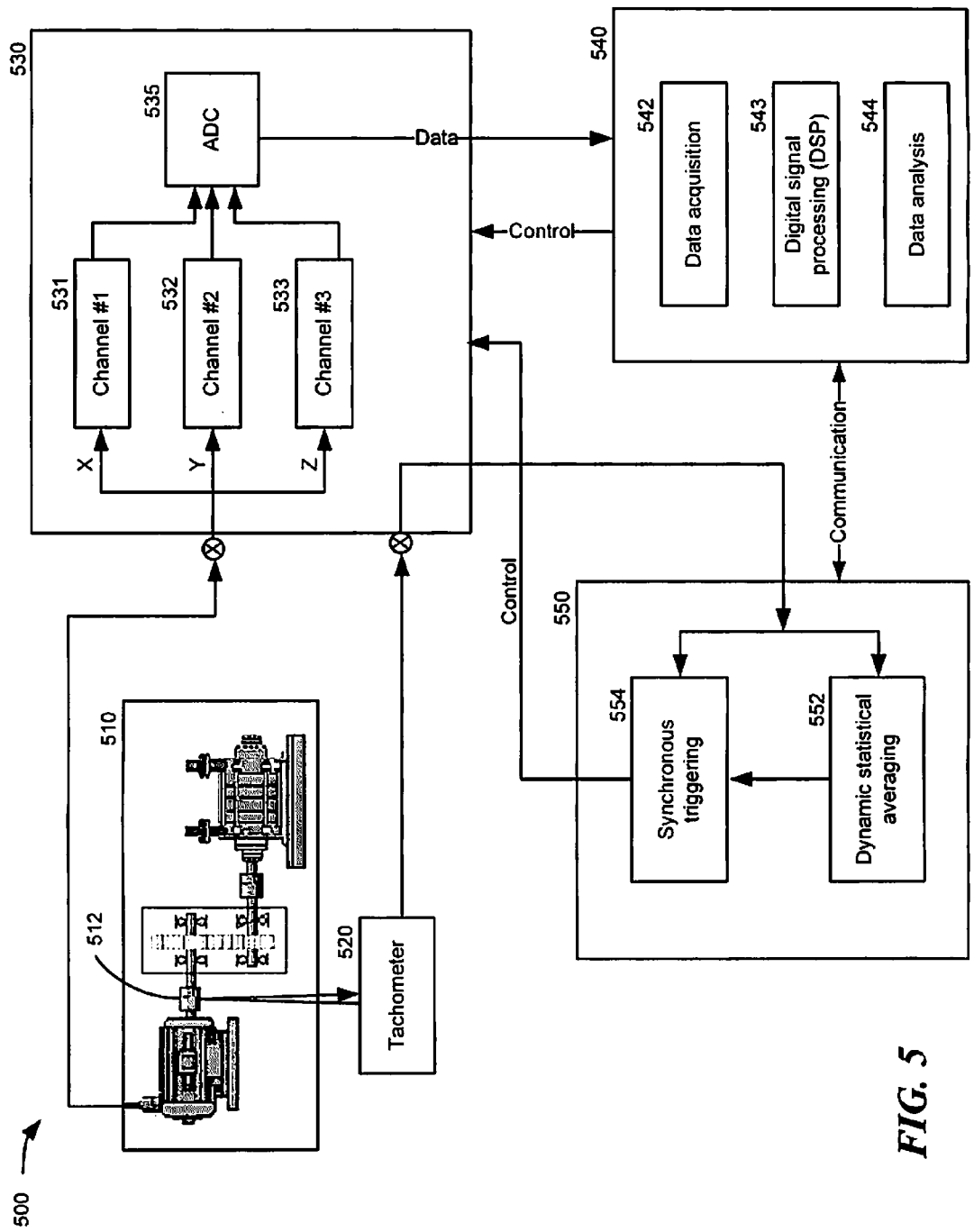
FIG. 5 depicts a block diagram illustrating an example of a vibration phase analysis system that uses dynamic statistical averaging and synchronous triggering, according to an embodiment of the disclosure.

FIG. 5 depicts a block diagram 500 illustrating an example of a vibration phase analysis system that uses dynamic statistical averaging, according to an embodiment of the disclosure.

Similar to the traditional phase analysis system, a rotating drive shaft 512 of the machine 510 to be analyzed is monitored by a tachometer 520. Accelerometer measurements from various locations on the machine 510 are fed to channel 1 531, channel 2, 532, and/or channel 3 533 in the analog front end 530. All three channels are not necessarily used to determine phase difference information. The channel outputs are sent to the ADC 535, and the output of the ADC 535 is sent to the processor 540. Note that in contrast to the traditional vibration phase analysis system, the tachometer signal is not sent to the ADC 535. Rather, the tachometer signal is sent to the logic device 550 for use in triggering the acquisition of data on the other channels 531, 532, 533. Further, the tachometer signal is not stored.

The logic device 550 includes two modules: a dynamic statistical averaging processor module 552 and a synchronous triggering module 554. The dynamic statistical averaging processor module 552 processes the incoming signal from the tachometer 520 and can determine an average speed of rotation of the drive shaft over a given period of time. When the dynamic statistical averaging processor module 552 determines that the RPM of the drive shaft 112, and thus the motor, is stable, the synchronous triggering module 554 searches for an edge of a tachometer pulse and then initiates acquisition of data from one or more of the channels 531, 532, 533. Either a rising edge or a falling edge can be used to trigger the acquisition of data from the other channels, but the selection of a rising or a falling edge must be consistent in acquiring data from channel to channel in order to properly synchronize the acquired waveforms.

The processor module 540 includes three modules: a data acquisition module 542, a digital signal processing (DSP) module 543, and a data analysis module 544. The data acquisition module 542 receives data from the ADC 535 in the analog front end 530 and communicates with the logic device 550 to determine when each of the channels should start acquiring data from the accelerometer monitoring the machine 510. By using synchronous triggering based upon an edge of a stable series of tachometer pulses, the phase information from the signals received over channels 531, 532, 533 is retained, and phase differences can be calculated. The analysis module 544 analyzes the phase difference between the channels. In one embodiment, the analysis module 544 can also use the determined phase difference to diagnose a machine fault. The DSP module 543 performs processing on data from the ADC 535 including, but not limited to, fast Fourier transforms (FFTs) analysis of vibration spectra.

There are cost-saving advantages to using the vibration phase analysis system over the traditional system. For example, the need for an analog to digital channel for the tachometer signal is eliminated because the tachometer signal does not need to be processed by the ADC 535. Further, no additional processing power is needed to process the tachometer signal. Also, no memory is used to acquire and store the tachometer signal for later processing because only tachometer pulse edges need to be identified.

Figure 6:
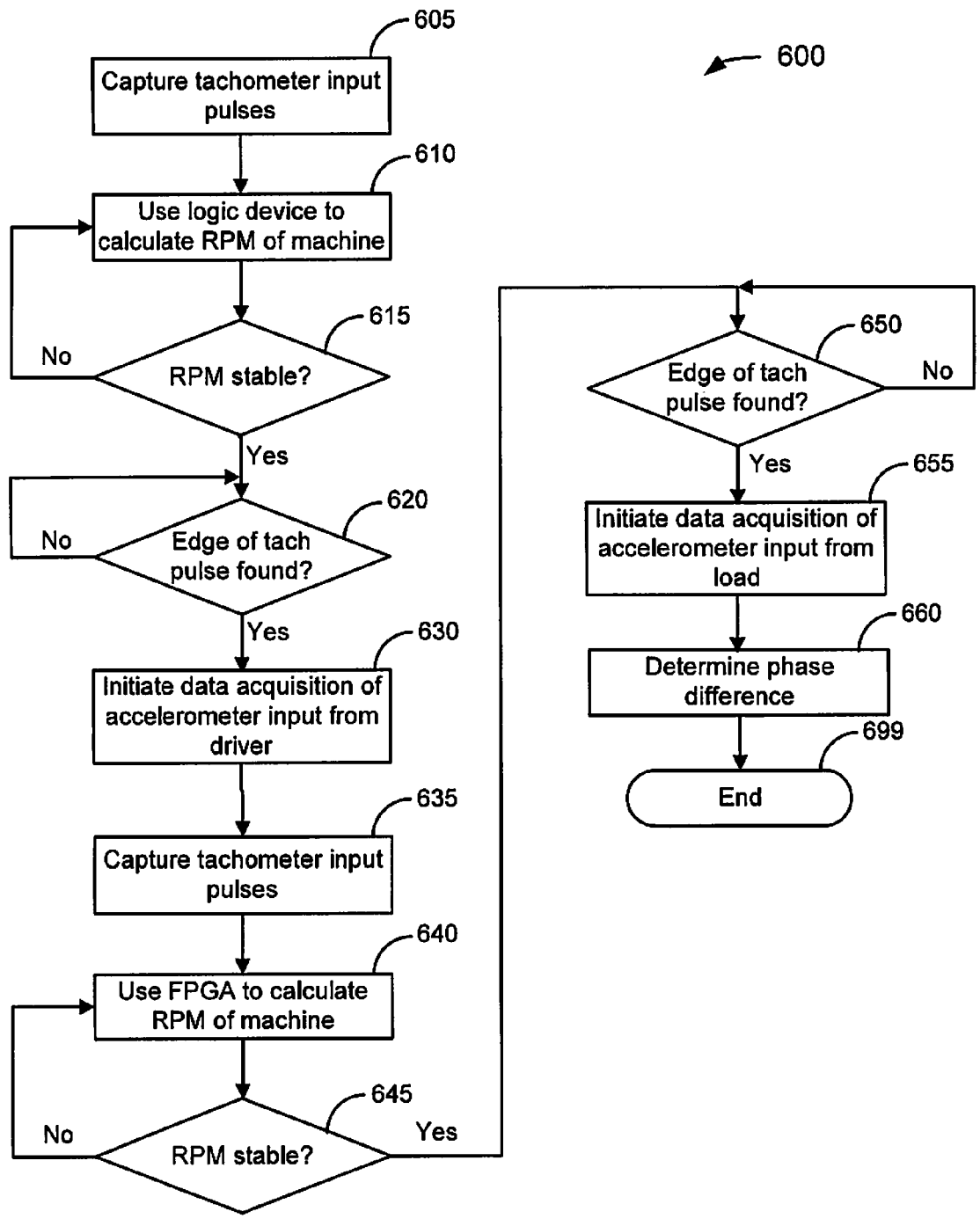
FIG. 6 depicts a flow diagram illustrating an exemplary process of vibration phase analysis using dynamic statistical averaging and synchronous triggering, according to an embodiment of the disclosure.

FIG. 6 depicts a flow diagram 600 illustrating an exemplary process of vibration phase analysis using dynamic statistical averaging and synchronous triggering, according to an embodiment of the disclosure.

At block 605, tachometer pulses that provide a rotational reference of the drive shaft are captured by the system. Then at block 610, a logic device is used to calculate the RPM of the rotating drive shaft. Next, at decision bock 615, the system determines if the RPM is stable. If the RPM is not stable (block 615—No), the process returns to block 610 re-calculate the RPM of the shaft. If the RPM is stable (block 615—Yes), the process continues to decision block 620.

At decision block 620, the system attempts to find the edge, either rising or falling, of a tachometer pulse. If the system does not find an edge of a tachometer pulse (block 620—No), the process remains at decision block 620. If the system does find an edge of a tachometer pulse (block 620—Yes), the process continues to block 630.

At block 630, by synchronizing to the edge of the tachometer pulse, the system initiates data acquisition of accelerometer input from the section of the machine being evaluated, for example the driver. Note that unlike with the traditional vibration phase analysis method, the tachometer signal does not need to be acquired continuously and stored in memory for synchronizing the accelerometer waveforms later. Only the edge of one of the tachometer pulses needs to be identified to trigger acquisition of the vibration waveform. After the accelerometer input is acquired from a first section of the machine, the accelerometer should be moved by a user to measure a second section of the machine, for example the load. While there may be inaccuracies arising from sequential acquisition due to RPM changes during acquisition of accelerometer data, similar inaccuracies would arise for concurrent sampling of accelerometer data with the traditional method.

At block 635, the system again captures the tachometer input pulses, and uses the logic device to calculate the RPM of the machine at block 640. At decision block 645, the system decides whether the RPM is stable. If the RPM is not stable (block 645—No), the process returns to block 640. If the RPM is stable (block 645—Yes), the process continues to decision block 650. At decision block 650, the system again attempts to Find the edge of a tachometer pulse. If the system does not find an edge of a tachometer pulse (block 650—No), the process remains at decision block 650. If the system does find an edge of a tachometer pulse (block 650—Yes), the process continues to block 655.

At block 655, similar to block 630, by synchronizing to the edge of the tachometer pulse, the system initiates data acquisition of accelerometer input from a different section of the machine being evaluated, for example the load. Note that if the system finds and uses a rising edge of a tachometer pulse for synchronization at blocks 620 and 630, the system must also find and use a rising edge for synchronization at blocks 650 and 655. Likewise, if a falling edge is used at blocks 620 and 630, the system must consistently use a falling edge at blocks 650 and 655.

After the second accelerometer waveform has been acquired and stored, at block 660 the system determines the phase difference between the two sequentially acquired signals. Because the data acquired at block 630 and at block 650 are triggered by the logic device using a consistent edge of a stable tachometer signal, the data is synchronous, despite the delay in acquiring the second waveform.

A third section of the machine can also be analyzed by acquiring a third vibration waveform with the accelerometer. After the user moves the accelerometer to monitor the appropriate section, blocks 635-655 can be repeated with the new accelerometer data. Then a phase difference between any of the three acquired vibration waveforms can be determined at block 660. The process ends at block 699.

Figure 7:
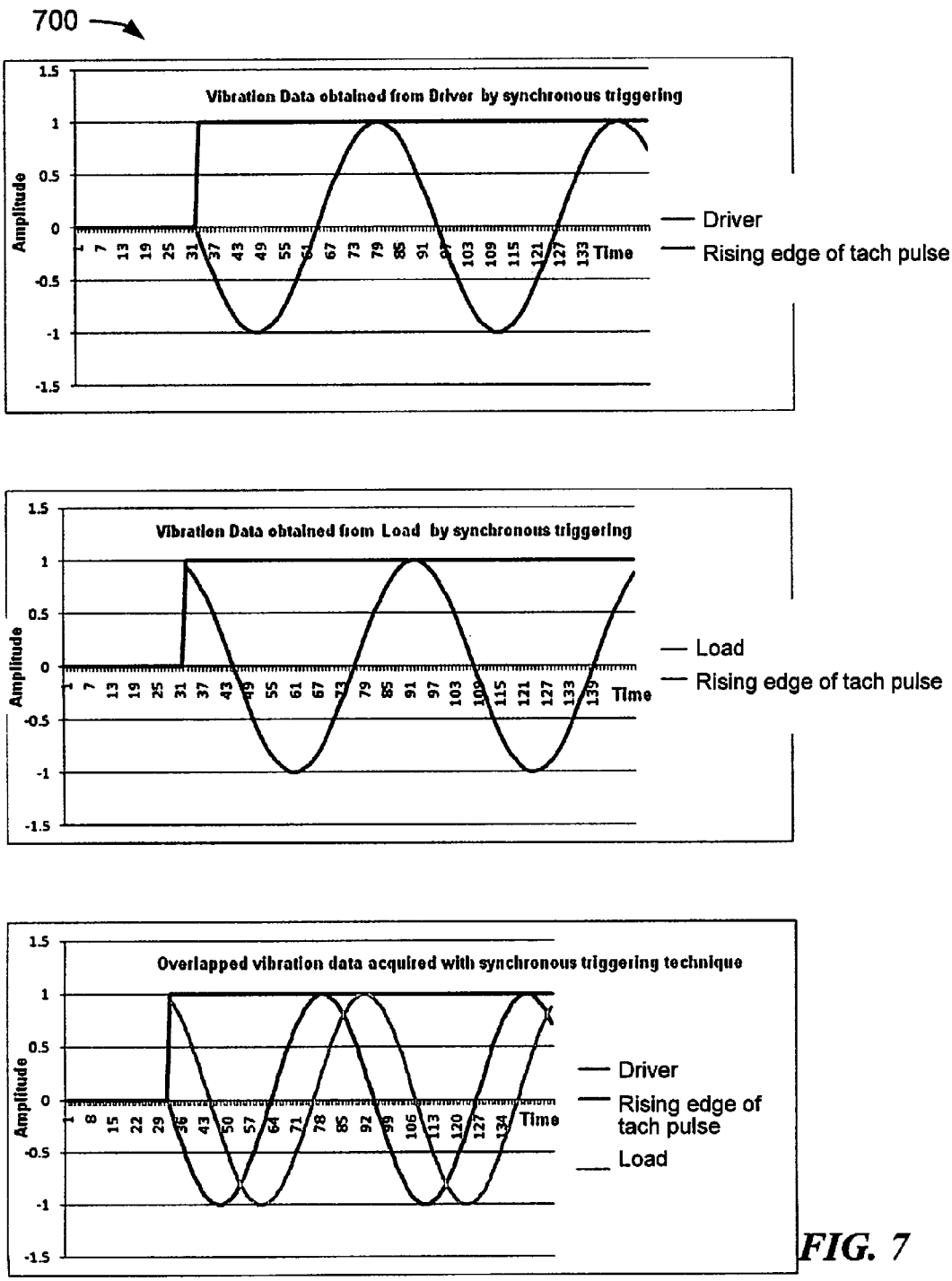
FIG. 7 shows graphs for obtaining phase information by using a rising edge of a tachometer pulse for synchronous triggering, according to an embodiment of the disclosure.

FIG. 7 shows graphs for obtaining phase information by using synchronous triggering off of a rising edge of a tachometer pulse, according to an embodiment of the disclosure.

The top graph in FIG. 7 shows a rising edge of a tachometer pulse and vibration data obtained from the driver through the use of synchronous triggering using the rising edge of the tachometer pulse.

The middle graph in FIG. 7 shows a rising edge of a tachometer pulse and vibration data obtained from the load through the use of synchronous triggering using the rising edge of the tachometer pulse.

The bottom graph in FIG. 7 shows both the driver and load vibration data as acquired through the synchronous triggering technique along with the rising edge of the tachometer pulse used to synchronize the waveforms. From this graph, it is straightforward to determine the phase difference between the driver and load vibration signals.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this patent application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

What is claimed is:

1. A vibration analysis system comprising:
a tachometer,
a diagnostic engine, and
a logic device,
wherein the tachometer monitors revolutions of a rotating shaft coupled to a variable frequency drive (VFD) and generates a tachometer signal, the logic device determines speed parameters of the rotating shaft from tachometer signal data collected over a period of time, wherein the logic device selects a maximum revolution, a minimum revolution, and an average revolution of the rotating shaft as the speed parameters, and then, the diagnostic engine correlates the speed parameters with peaks in a vibration spectrum of the VFD to identify faults in a machine coupled to the rotating shaft, and the diagnostic engine derives a conclusion of energy distribution at different frequencies by selecting correlations of the maximum revolution, the minimum revolution, and the average revolution with the peaks from the vibration spectrum of the VFD.

2. The vibration analysis system of claim 1 wherein the logic device uses a dynamic statistical averaging technique to determine the speed parameters.

3. A vibration analysis system comprising a tachometer and a logic device, wherein the tachometer monitors revolutions of a rotating shaft coupled to a variable frequency drive (VFD) and generates a tachometer signal, and the logic device determines speed parameters of the rotating shaft from the tachometer signal, wherein the speed parameters are correlated with peaks in a vibration spectrum of the VFD to identify faults in a machine coupled to the rotating shaft, wherein the system further comprises an accelerometer configured to sequentially obtain waveforms from a first point and a second point of a machine coupled to the VFD, wherein a tachometer pulse edge is used to synchronously trigger acquisition of the waveforms to determine a phase difference between the waveforms.

4. The vibration analysis system of claim 3 wherein a rising or a falling edge of the tachometer pulse is used to synchronously trigger acquisition of the waveforms.

5. The vibration phase analysis system of claim 3 wherein the logic device determines the tachometer pulses are stable prior to acquiring the waveforms.

6. A vibration analysis system, comprising:
a tachometer configured to monitor rotations of a drive shaft and generate one or more tachometer pulses for each revolution of the drive shaft;
an analog front end configured to sequentially capture with a same accelerometer at least two vibration waveforms from different points of a machine coupled to the drive shaft;
a logic device configured to perform statistical averaging of the tachometer pulses to calculate an average speed of the drive shaft and synchronously trigger acquisition of the vibration waveforms based upon the tachometer pulses, wherein a tachometer pulse edge is used to synchronously trigger acquisition of the vibration waveforms; and
a data processor coupled to the analog front end and the logic device, wherein the data processor is configured to analyze the vibration waveforms to determine a phase difference, wherein the phase difference aids in identifying a fault of the machine.

7. The system of claim 6 wherein either a rising pulse edge or a falling pulse edge is used for synchronously triggering acquisition of the vibration waveforms.

8. A vibration analysis system, comprising:
a means for monitoring rotations of a drive shaft and generating a pulse for each revolution of the drive shaft;
an analog front end configured to sequentially capture with a same accelerometer at least two vibration waveforms from different points of a machine coupled to the drive shaft;
a means for performing statistical averaging of the pulses to calculate speed parameters of the drive shaft and start acquisition of the vibration waveforms based upon synchronous triggering using the pulses, wherein a pulse edge is used to synchronously trigger acquisition of the vibration waveforms; and
a data processor coupled to the analog front end and the means for performing statistical averaging of the pulses, wherein the data processor is configured to analyze the vibration waveforms to determine a phase difference.

9. The system of claim 8, further comprising an analyzer coupled to the data processor configured to identify a fault of the machine based at least upon the determined phase difference.

10. The system of claim 8 wherein either a rising pulse edge or a falling pulse edge is used for synchronous triggering.

11. A method of analyzing vibration spectra, comprising:
monitoring a variable rotational speed of a shaft coupled to a variable frequency drive (VFD);
determining a maximum, a minimum, and an average revolution of the shaft over a period of time;
measuring a vibration frequency spectrum of the VFD;
selecting the maximum, minimum, and average revolutions of the shaft of the VFD, and then, correlating the maximum, minimum, and average revolutions with peaks in the vibration frequency spectrum;
determining an energy frequency distribution; and
with a diagnostic engine, identifying a fault of a machine coupled to the shaft by selecting correlations of the maximum revolution, the minimum revolution, and the average revolution with peaks from the vibration spectrum of the VFD.

12. The method of claim 11 wherein calculating the maximum, minimum, and average revolution of the shaft comprises performing dynamic statistical averaging.

13. A method of obtaining a phase difference between two sequentially acquired waveforms, comprising:
monitoring a rotational speed of a shaft of a machine;
generating a pulse for at least each revolution of the shaft;
identifying a stable rotational rate of the shaft;
acquiring a first vibration waveform using synchronous triggering;
acquiring a second vibration waveform upon synchronous triggering; and
determining a phase difference between the first vibration waveform and the second vibration waveform to identify a fault of the machine based at least upon the phase difference.

14. The method of claim 13, wherein synchronous triggering comprises identifying an edge of one of the pulses.

15. A method of performing a vibration analysis on a machine, comprising:
monitoring a rotational speed of a shaft coupled to a VFD and a machine;
generating a pulse for at least each revolution of the shaft;
determining speed parameters of the shaft;
measuring a vibration frequency spectrum of the VFD; and
correlating the speed parameters of the shaft with peaks in the vibration frequency spectrum to determine an energy frequency distribution;
identifying a stable rotational rate of the shaft;
acquiring a first vibration waveform using synchronous triggering;
acquiring a second vibration waveform upon synchronous triggering;
determining a phase difference between the first vibration waveform and the second vibration waveform; and
identifying a fault of the machine based at least upon the phase difference and the correlation of the speed parameters of the shaft with the vibration frequency spectrum.

16. The method of claim 15 wherein the speed parameters comprise a maximum speed, a minimum speed, and an average speed of the shaft.

17. The method of claim 15 wherein synchronous triggering comprises identifying an edge of one of the pulses.

18. The method of claim 17 wherein either a rising pulse edge or a falling pulse edge is used for synchronous triggering.

* * * * *